(12) United States Patent
Delaporte

(10) Patent No.: US 6,505,515 B1
(45) Date of Patent: Jan. 14, 2003

(54) ACCELERATION DETECTOR FOR A TIRE OF A MOTOR VEHICLE

(75) Inventor: Francis Delaporte, Osny (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/857,893

(22) PCT Filed: Dec. 10, 1999

(86) PCT No.: PCT/FR99/03084
§ 371 (c)(1),
(2), (4) Date: Jun. 11, 2001

(87) PCT Pub. No.: WO00/36424
PCT Pub. Date: Jun. 22, 2000

(30) Foreign Application Priority Data

Dec. 11, 1998 (FR) .............................. 98 15667

(51) Int. Cl.⁷ ................................. G01L 7/00
(52) U.S. Cl. ....................................... 73/714
(58) Field of Search ................. 73/714–728, 49.3, 73/517 A, 517 R, 862.625, 862.636, 862.637, 862.68

(56) References Cited

U.S. PATENT DOCUMENTS

| | | | | |
|---|---|---|---|---|
| 3,583,240 A | * | 6/1971 | Ostwald | 188/187 |
| 4,574,641 A | * | 3/1986 | Rosaz et al. | 137/228 |
| 4,726,233 A | * | 2/1988 | Eckardt et al. | 338/4 |
| 5,165,289 A | * | 11/1992 | Tilmans | 73/702 |
| 5,209,119 A | * | 5/1993 | Polla et al. | 73/720 |
| 5,310,450 A | * | 5/1994 | Offenberg et al. | 148/DIG. 159 |
| 5,777,239 A | * | 7/1998 | Fuglewicz | 73/862.625 |
| 6,425,289 B1 | * | 7/2002 | Igel et al. | 73/715 |

FOREIGN PATENT DOCUMENTS

| | | | |
|---|---|---|---|
| DE | 4125467 | 2/1993 | G01P/15/08 |
| DE | 4303582 | 8/1994 | B60C/23/04 |
| DE | 19548759 | 6/1997 | G01L/5/16 |

* cited by examiner

*Primary Examiner*—William Oen
(74) *Attorney, Agent, or Firm*—Eugene C. Rzucidlo; Greenberg Traurig LLP

(57) ABSTRACT

The acceleration detector for a tire of a motor vehicle comprises an elastically deformable membrane and, fixedly attached to the membrane, a test mass to deform it under the effect of acceleration, and an acceleration strain gauge sensitive to the deformations of the membrane under the effect of an acceleration force exerted by the test mass.

7 Claims, 1 Drawing Sheet

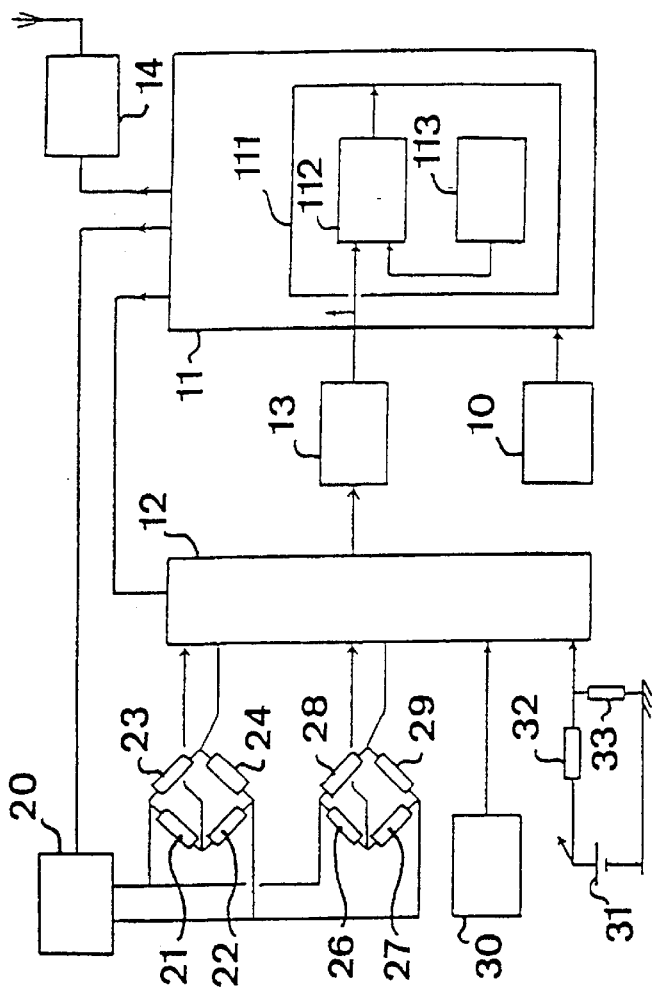
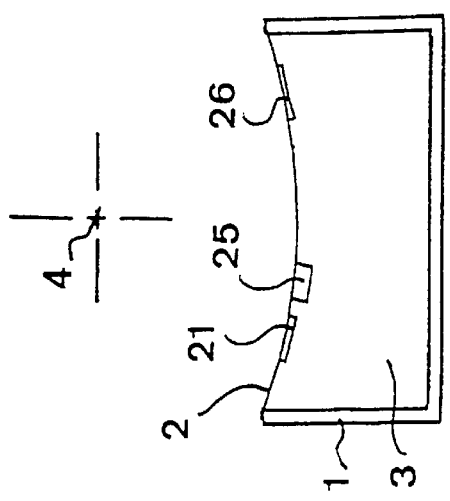
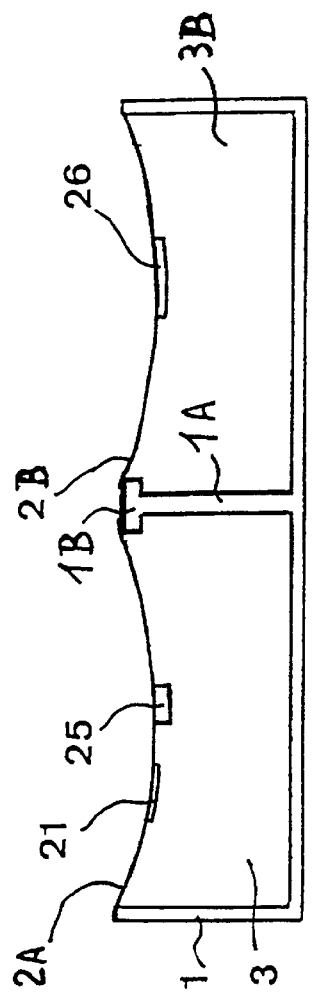
FIGURE 3
FIGURE 2
FIGURE 1

ACCELERATION DETECTOR FOR A TIRE OF A MOTOR VEHICLE

FIELD OF THE INVENTION

The present invention is directed to an acceleration detector for a tire of a motor vehicle, where the acceleration detector is also sensitive to the tire pressure, Sa and, thus, also functions as a pressure sensor.

BACKGROUND OF THE INVENTION

In order to ensure the safety of a motor vehicle, each of its wheels is provided with a pressure sensor housed in the tire and connected by radio to a computer monitoring the state of the tires, located in the passenger compartment and indicating any abnormality. Since the sensor is inaccessible it is powered by a battery of which the life must be prolonged to the greatest possible extent. In order to do so the sensor comprises a very low power-consumption monitoring clock register which activates it only cyclically to make a measurement and emit an alarm if required.

When the vehicle is parked it is pointless to emit repeated alarms since there is no risk of accident. This sensor then operates at a slower rate with extended cycles and it only changes to the normal rate when an associated acceleration detector detects the rotation of the wheel.

A flexible blade has previously been used as an acceleration detector, mounted in a sealed Reed relay bulb housed in the tire and fixedly attached to the pressure sensor fixed to the valve. The blade established a contact controlling the change of the pressure sensor to the normal rate in the presence of the centrifugal acceleration of rotation of the wheel. In other applications, a reed bulb for detection of acceleration is similarly housed in the tire with a pressure sensor but it then serves to provide, by radio, measurements used elsewhere.

The Reed bulb, however, has the disadvantage of being relatively expensive and unable properly to withstand the shocks to which the wheels are subjected.

The present invention thus aims to provide an acceleration detector which is inexpensive and more robust.

SUMMARY OF THE INVENTION

To this end the invention relates to an acceleration detector for a tire of a motor vehicle comprising an elastically deformable membrane and, fixedly attached to the membrane, a test mass to deform it under the effect of acceleration, and an acceleration strain gauge sensitive to the deformations of the membrane under the effect of an acceleration force exerted by the test mass, characterized in that it comprises a pressure strain gauge sensitive to the pressure of the tire so that the acceleration detector also constitutes a pressure sensor.

Apart from the fact that the shocks are dampened since it is a membrane which serves to detect the acceleration, the cost of the acceleration detector is low since it also constitutes a pressure sensor.

Advantageously a pressure measuring system and an acceleration detection system are integrated, at least in part, into an integrated circuit and, preferably, the detector is formed by a component disposed in a hollow sealed housing closed by thereby, the membrane being of silicon.

In one particular embodiment, the acceleration detection system is arranged to command activation of the pressure measuring system.

BRIEF DESCRIPTION OF THE DRAWINGS

The invention will be better understood with the aid of the following description of two advantageous embodiments of the acceleration detector of the invention, associated, in these examples, with a pressure sensor, with reference to the attached drawing in which:

FIGS. 1 and 2 are schematic cross-sectional views of the sensor-detector of two respective embodiments, and FIG. 3 is a functional block diagram of electronic circuits of the pressure sensor and the acceleration detector, of each of the two embodiments, which in this case controls the rate of the pressure detector into which it is fully integrated in this example.

DETAILED DESCRIPTION OF THE PREFERRED EMBODIMENTS OF THE INVENTION

In FIG. 1 the reference 1 designates a hollow integrated circuit housing forming a sealed enclosure 3, of which one face is formed by a deformable membrane 2 fixed peripherally to the edge of the housing 1. The membrane 2 is in this case formed by an elastically deformable layer of silicon a few microns thick. A permeable cap offering mechanical protection for this layer can be provided.

In this example, and as explained hereinunder, the rotation acceleration detector is integrated with a pressure sensor also using the membrane 2 and mounted in the tire of a motor vehicle wheel. For this reason the membrane 2 is not, in this case, a simple elastically deformable strip or bar which would suffice for such an acceleration detector but, in contrast, in this example it sealingly closes the cavity of the housing 1 in order to deform under the effect of the pressure of an external fluid, in this case the air in the tire which contains the detector-sensor illustrated, fixed to the valve.

With respect to the detection of acceleration owing to the rotation of the wheel, the membrane 2 has a strain gauge 21 fixedly attached to the membrane 2 and sensitive to its strain deformations, as well as a test mass 25 also fixedly attached to the membrane 2 in order to deform it under the effect of acceleration owing to the rotation of the wheel. In return, the gauge 21 undergoes deformation stress and in this example has a corresponding impedance variation. The strain gauge 21 in this case comprises, screen printed on the internal face of the membrane 2, a resistor in the form of a thick layer strip which follows deformation thereof and of which the resistance consequently varies according to a known law dependent upon the acceleration. This law can be determined by testing in the factory and stored in the detector. Preferably, as in this case, the mass 25 is relatively close to the gauge 21 in order to have optimal effectiveness.

In the same way the membrane 2 has, in this example, on the inner side of the cavity 3, another strain gauge 26, in this case identical to the gauge 21, serving to measure the aforementioned pressure of the air in the tire.

As shown in FIG. 3, the resistor 21 is associated with a circuit for measuring its impedance, in this case its resistance, comprising a balanced Wheatstone type bridge of elements 22, 23 and 24 with impedances determined according to that of the gauge 21 at rest. The products of the values of the opposite resistors are equal: $[R21] \times [R24] = [R22] \times [R23]$. Provision could also be made for the resistor 24 to be such a gauge in order to increase the sensitivity. A source 20, in this case of direct voltage, powers one diagonal of the bridge 21–24, of which the ends of the other diagonal are connected, in this case via a multiplexer circuit 12, to an analogue/digital convertor 13 (ADC). A time base 10 ensures the sequencing of the operation of the detector-sensor. A microprocessor 11 with its operation regulated by the time base 10 controls all the afore-mentioned circuits and receives the measurements from the ADC 13 in order to process them and utilize them locally and/or transmit them by a controlling radio circuit 14 which it operates. In this example the acceleration measurements are used locally to control the pressure sensor so that only the measurements of the latter, or the alarm which may result therefrom, are transmitted by the radio transmitter 14. However, in other examples the acceleration detector could serve as an odometer and its measurements would then be transmitted by radio.

The microprocessor 11 comprises a circuit 111 for monitoring and activating the pressure sensor, circuit 111 which receives the acceleration measurements from the converter 13 in order to slow down, from, for example 6 seconds (pressure alarm rate) to one minute (normal rate), the rate of the pressure measurements (26) when the rotational speed of the wheel, and thus the acceleration measured, is lower than a specific threshold and even to slow down to a cycle of one hour in the absence of rotation. The circuit 111 comprises a comparator 112 receiving, on one channel, the measured values and, on the other channel, a threshold resistance variation value from a memory 113. The gauge 26 is similarly inserted in a bridge 26, 27, 28 and 29 powered in the same way as the bridge 21–24 and similarly connected at the output to a channel of the multiplexer 12. Apart from the two channels for the two afore-mentioned bridges, the multiplexer 12 comprises a third measuring channel connected to a temperature sensor 31 for correction of the pressure and acceleration measurements, and a fourth measuring channel connected to the mid-point of a divider bridge 32, 33 biased by a battery 31 which powers all the circuits. The microprocessor 11 is integrated in the sealed hollow housing 1 in the same way in this case as the various other electric circuits in order to form an on-demand circuit (ASIC) constituting the sensor-detector.

The operation of these circuits will now be explained in more detail.

The sensor-detector illustrated is orientated, in the operational position, in such a way that rotation of the wheel which carries it exerts a centrifugal acceleration force deforming the membrane 2, i.e., having a vertical component in FIG. 1. If one assumes, for example, that the axis 4 of the wheel (shown very close and not to scale) is located above the sensor-detector of FIG. 1, the mass 25 operationally associated with the gauge 21 in such a case is subjected to a centrifugal force directed downwards towards the rigid base of the housing 3. The volume enclosed thereby can be placed under negative pressure or simply filled with a certain mass of gas, thus at a constant pressure at rest regardless of the effects of temperature, which are corrected by calculation.

To this centrifugal force, which is proportional to the speed of rotation, is added a periodic modulation upon each rotation of the wheel, owing to gravity and being of constant amplitude.

The membrane 2 fixedly attached to the gauge 21 of a certain mass is locally entrained thereby and distends and, at this very point, the thick layer resistor 21 distends, which in this case in the form of a strip fixedly attached over its whole length to the membrane 2.

The resistance variation which results from this is measured and digitized by the ADC 13 and transmitted to the monitoring circuit 111 of the microprocessor 11. In the circuit 111 the measurement of the value of the resistor 21, actually in this case its variation, is compared (112) with the threshold value (113) mentioned above, in order to change to, or remain at, a slow rate of activating for cyclical pressure measurements if the threshold is not reached, in this case this causes an adjustment of the pressure measuring cycle to a period of one how. The acceleration detector thus activates the pressure sensor at the desired rate.

The adjustment of the period of the pressure measuring cycles is made by loading a corresponding value into a clock register, for example a countdown circuit, which initiates a pressure measuring cycle to the schedule of the clock register and which is reset for the following cycle. Upon each acceleration or pressure measurement the microprocessor 11 activates the source 20 (by means of a switch, not shown) to power the bridges 21–24 and 26–29 for a brief instant and it also activates the ADC 13 and the comparator 112. On each occasion, the microprocessor 11 takes in the measurement of the resistance, in this case actually its variation, of the pressure gauge 26 which expresses the pressure of the tire. The acceleration measuring cycles can be independent of those of the pressure measurement and their power consumption remains low since they are not linked to a radio transmission.

The pressure measurements are transmitted by the transmitter 14 or processed locally by the microprocessor 11 which then possibly emits a radio alarm if a high or low pressure threshold is crossed, and accelerates the pressure measuring rate to the afore-mentioned period of 6 s, the absence of rotation can, however, demand a slowing of this rate.

There is a mutual influence between the two variables, pressure and acceleration, owing to the fact that in this case there is no separate bar (such as a membrane) and sealed membrane which appertain to the respective gauges 21 and 26 but that the membrane 2 is in this case common to the two gauges 21 and 26. This mutual influence can be limited in disposing the gauges 21, 26 at a distance from each other, i.e., by actually spacing the gauge 26 from the mass 25. Thus inward deformation owing to the centrifugal force imposed on the mass 25, which is particularly noticeable in a limited zone of the membrane 2 enclosing the gauge 21, will have a more limited effect on the other gauge 26 if these two gauges 21 and 26 have been spaced from each other by a maximum distance but without being placed too close to the rigid fixing edge of the membrane 2, which limits the deformations thereat. For example, the mutual spacing of the two gauges 21 and 26 or between the latter and the mass 25 will preferably be greater than half the largest dimension of the membrane 2.

In contrast, as the pressure acts over the whole surface of the membrane 2, the microprocessor 11 can, according to the pressure measurement by the gauge 26, deduce therefrom the undesired deformation owing to the pressure, or resistance variation, of the gauge 21 and thus correct the centrifugal force measurement, i.e., the measurement of rotational speed since the value of the mass 25 and its gyration radius are known. Conversely, the effect, even a limited effect, of the mass 25 on the deformation of the gauge 26 can similarly be estimated in the factory in order to draw up a table for correction of the pressure measurement.

Furthermore, since, with each rotation of the wheel, gravity modulates the acceleration measurement provided by the gauge 21, the microprocessor 11 can measure the rate of rotation of the wheel (odometer function) and compare it directly with a threshold to slow, or not slow, the rate of pressure measurements. It will be noted that the amplitude of this modulation, independent of the speed of rotation, will suffice in itself to characterize the effect of gravity when the wheel is rotating. It is thus possible to detect the existence of rotation which is the desired aim (vehicle moving and therefore cycles of 1 minute). The corresponding frequency measurement additionally provides the rotational speed value in order possibly in this case to regulate the cycles according to a number of thresholds. Such a frequency measurement can be carried out by the microprocessor 11 with band-pass filtering software in a number of adjacent channels, forming a bank of filters covering the desired range of frequencies.

Just the measurement, by the single acceleration gauge 21, of the alternative component of the deformation measurements of the membrane 2 under the effect of the mass 25 will thus suffice for the detection and measurement of the wheel rotation speed. A rotation detector of this type, actually detecting the angular position of the wheel could thus still operate if it were placed on the axis of rotation of a rotating element, thus without being subject to centrifugal force.

The rotational speed information thus acquired can also be used by the microprocessor 11 to determine the value of the centrifugal force measurement which the gauge 21 should provide at the speed in question, taking account of the mass 25, its radius of gyration and the mechanical characteristics of the membrane 2 and of the enclosure 3. Such a table showing correspondence between the speed and resistance variation can in practice be drawn up in the factory with a nominal pressure in the tire, and stored in the microprocessor 11.

In use, the microprocessor 11 can then compare, for the speed determined by gravity, the expected acceleration measurement-value of the gauge 21 with that actually measured. The difference between these two values represents the influence of a pressure variation.

For this reason, it would be possible in one variation to provide only a single gauge for detection and/or measurement of acceleration, operationally associated with any mass 25 but sufficient to deform the membrane 2. The alternative component of the variation in resistance of the single gauge would make it possible to deduce therefrom, according to the afore-mentioned table, the theoretical "continuous" component due to the rotation in order to compare it with (subtract it from) the "continuous" component actually measured, in order to deduce the pressure therefrom. "Continuous" component should be understood to mean a value which varies only with cycles much longer than the period of rotation of the wheel, i.e., progressive acceleration or deceleration cycles of the vehicle comprising the wheel, thus over a large number of rotations of the wheel.

The second exemplified embodiment of the acceleration detector of FIG. 2, in which a pressure sensor is also provided, corresponds substantially to a duplication of the elements of FIG. 1, the new duplicated elements bearing the reference of the corresponding original element with the suffix "B". Two sealed cavities 3 and 3B are thus formed which are in this case joined together and partitioned by a sealed wall 1A terminated on the side opposite to the base by an edge 1B. For the gauges 21, 26, the difference with respect to FIG. 1 is that the membrane 2A, counterpart of the membrane 2, is exclusively allocated to the acceleration detector and therefore no longer carries the pressure gauge 26 which has been moved to the membrane 2B and therefore allocated exclusively to the pressure sensor. In other words this equates in FIG. 1 to artificially separating the membrane 2 into two zones 2A, 2B without mutual deformation influence, i.e., the membrane 2 will be fixedly attached to a sort of rigid bar (1B) perpendicular to the plane of FIG. 1, separating the zone 2A carrying the elements 21, 25 from that, 2B, carrying the gauge 26. In FIG. 2 there are two physically distinct membranes 2A, 2B each fixed peripherally in particular to the edge 1B in order to close a corresponding opening of the housing. The two gauges, acceleration strain gauge 21 and pressure strain gauge 26, are thus respectively fixedly attached to two elastically deformable silicon membranes 2A, 2B closing the hollow sealed housing 3, 3A. In order to overcome the effect of pressure on the acceleration detection membrane 2A this membrane can have a higher resistance to deformation than that of the pressure measuring membrane 2B since it will suffice to provide a test mass 25 sufficient to obtain the desired sensitivity. Furthermore, it is also possible to retain the sealing-tightness of the cavity 3A for the pressure detection but to allow the air pressure to act on both sides of the acceleration detection membrane 2A in the cavity 3.

What is claimed is:

1. An acceleration detector for a tire of a motor vehicle comprising an elastically deformable membrane and, fixedly attached to the membrane, a test mass to deform it under the effect of acceleration, and an acceleration strain gauge sensitive to the deformations of the membrane under the effect of an acceleration force exerted by the test mass, characterized in that it comprises a pressure strain gauge sensitive to the pressure of the tire so that the acceleration detector also constitutes a pressure sensor, and a pressure measuring system and an acceleration detection system which are integrated, at least in part, into an integrated circuit, the acceleration detection system being arranged to command activation of the pressure measuring system.

2. The detector according to claim 1, wherein the two gauges, the acceleration strain gauge and the pressure strain gauge are fixedly attached to the same membrane.

3. The detector according to claim 1, wherein the two gauges, the acceleration strain gauge and the pressure strain gauge are respectively fixedly attached to two elastically deformable membranes.

4. The detector according to one of claim 1, formed by a component disposed in a hollow sealed housing closed by the membrane.

5. The detector according to claim 3, formed by a component disposed in a hollow sealed housing closed by the membrane.

6. The detector according to one of claim 4, wherein the membranes are made of silicon.

7. The detector according to one of claim 1, wherein a multiplexer circuit is provided common to the two systems to provide a circuit for processing measurements controlling a control circuit, pressure measurements, acceleration measurements, temperature measurements of a thermometer and measurements of he voltage of a power-supply battery.

* * * * *